United States Patent Office 3,096,351

Patented July 2, 1963

3,096,351

4,4-DIALKYL ANDROSTANES

Howard J. Ringold, Shrewsbury, Mass., and George Rosenkranz, Mexico City, Mexico, assignors, by mesne assignments, to Syntex Corporation, a corporation of Panama No Drawing. Filed May 31, 1961, Ser. No. 113,629
Claims priority, application Mexico, Feb. 21, 1956
14 Claims. (Cl. 260—397.4)

The present invention relates to cyclopentanophenanthrene derivatives and to a process for the production thereof.

More particularly the present invention relates to novel hormones of the androgenic type which have a high ratio of anabolic to androgenic activities. The novel compounds of the present invention are members of the androstane and the 19-nor-androstane series having 4,4-dialkyl substituents and include 4,4-dialkyl-androstan-17β-ol-3-one, 4,4-dialkyl-19-nor-androstan-17β-ol-3-one, the 17α-lower alkyl derivatives of these compounds and esters of those compounds having esterifiable (non-tertiary) hydroxyl groups.

In accordance with the present invention it has been discovered that the novel compounds just described may be prepared by reacting testosterone or 19-nor-testosterone or a 17α-lower alkyl derivative thereof with an alkyl iodide in a tertiary alcohol in the presence of a potassium t-alkoxide to form the corresponding novel 4,4-dialkyl derivative. Upon hydrogenation in the presence of a hydrogenation catalyst there is formed the corresponding 4,4-dialkyl androstane derivative.

The novel compounds of the present invention may therefore be characterized by the following formulas:

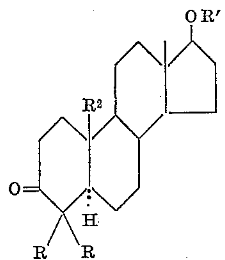

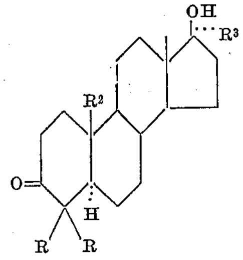

In the above formulas, R represents an alkyl group, preferably a lower alkyl group of less than 7 carbon atoms such as methyl, ethyl or propyl. $R^1$ represents hydrogen or an acyl group of the type conventionally found in an esterified steroid alcohol. These are generally those derived from hydrocarbon carboxylic acids of less than 12 carbon atoms such as acetic, propionic, cyclopentylpropionic, benzoic etc. $R^2$ represents hydrogen or methyl. $R^3$ represents a lower alkyl group of less than 7 carbon atoms such as methyl, ethyl or propyl.

The novel compounds of the present invention may be prepared by a process exemplified by the following equation:

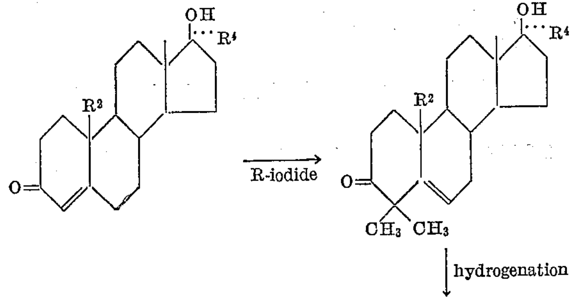

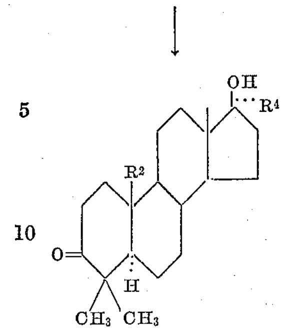

In the above equation $R^2$ represents the same groups as heretofore. $R^4$ may represent hydrogen or is the same as $R^3$ as previously defined.

In practicing the process as outlined above, testosterone, 19-nor-testosterone or the 17α-lower alkyl derivatives thereof such as the 17α-methyl, 17α-ethyl or 17α-propyl derivative are added to a tertiary alcohol solution of potassium metal. There is then added a lower alkyl iodide such as methyl iodide and the mixture is stirred at room temperature for a period of time of the order of four hours under a nitrogen atmosphere. The reaction mixture was then poured into water, the organic solvent removed by vacuum distillation and the precipitate purified to give the corresponding 4,4-di lower alkyl-$\Delta^5$-androsten-17β-ol-3-one compound or the 19-nor or 17α-lower alkyl derivative. The 4,4-di lower alkyl-$\Delta^5$-androsten-17β-ol-3-one or 19-nor compounds were then conventionally esterified by reaction with an acid anhydride of hydrocarbon carboxylic acids of less than 12 carbon atoms in pyridine or with an acid chloride to give the corresponding 17-esters.

Hydrogenation of the $\Delta^5$-compounds thus prepared in the presence of a hydrogenation catalyst preferably a palladium catalyst, at a temperature slightly over room temperature until slightly more than 1 equivalent of hydrogen had been taken up, gave the corresponding androstane derivatives. In this instance also conventional esterification gave the corresponding 17-esters of hydrocarbon carboxylic acids of less than 12 carbon atoms with the secondary 17-hydroxy groups.

This application is a continuation-in-part of our copending applications Serial No. 641,038, filed February 19, 1957, and Serial No. 702,761, filed December 16, 1957.

The following specific examples serve to illustrate but are not intended to limit the present invention:

*Example I*

2 g. of potassium metal was dissolved in 100 cc. of t-butanol, under an atmosphere of nitrogen. 5 g. of testosterone was added to the solution and when it had dissolved, there was added 6.5 cc. of methyl iodide and the mixture was stirred at room temperature for 4 hours under an atmosphere of nitrogen. It was then poured into water, the organic solvent was removed by vacuum distillation and the precipitate was collected and washed to neutral. Crystallization from acetone afforded 4,4-dimethyl-$\Delta^5$-androsten-17β-ol-3-one with M.P. 198–201° C., $[\alpha]_D$ −10° (chloroform).

When in the above procedure methyl iodide was substituted by ethyl iodide or propyl iodide, there was obtained respectively 4,4-diethyl-$\Delta^5$-androsten-17β-ol-3-one and 4,4-dipropyl-$\Delta^5$-androsten-17β-ol-3-one.

By conventional reaction with acetic anhydride in pyridine there was prepared the 17-acetate derivative of all the above compounds. In a similar conventional way there was also prepared other esters such as the propionates, benzoates and cyclopentylpropionates.

*Example II*

5 g. of 17α-methyl-testosterone was treated in exactly the same way as described in Example I for testosterone, thus giving 4,4,17α-trimethyl-$\Delta^5$-androsten-17β-ol-3-one with M.P. 194–196° C., $[\alpha]_D$ —32° (chloroform).

When in the above example methyl iodide was substituted by ethyl iodide or propyl iodide, there was obtained respectively 4,4-diethyl-17α-methyl-$\Delta^5$-androsten-17β-ol-3-one and 4,4-dipropyl-17α-methyl-$\Delta^5$-androsten-17β-ol-3-one.

Similarly, the corresponding 17α-ethyl and 17α-propyl derivatives were obtained starting from 17α-ethyl and 17α-propyl testosterone, respectively.

*Example III*

One gram of 4,4-dimethyl-$\Delta^5$-androsten-17β-ol-3-one was added to a suspension of 300 mg. of 5% palladium on charcoal catalyst previously hydrogenated in 50 cc. of methanol. The compound was hydrogenated at 25° C. and atmospheric pressure until the equivalent of 1.1 mols of hydrogen had been absorbed (3 hours). The catalyst was filtered and the solution evaporated. The residue crystallized from acetone-hexane to give 4,4-dimethyl-androstan-17β-ol-3-one with M.P. 145–147° C., $[\alpha]_D$ —12° (chloroform).

By conventional reaction with acetic anhydride in pyridine there was prepared the 17-acetate derivative of the above compound. In a similar conventional way there was also prepared other esters such as the propionates, benzoates and cyclopentylpropionates.

*Example IV*

The treatment of 4,4,17α-trimethyl-$\Delta^5$-androsten-17β-ol-3-one by the method described in Example III afforded 4,4,17α-trimethyl-androstan-17β-ol-3-one with M.P. 183–185° C., $[\alpha]_D$ —35° (chloroform).

*Example V*

2 g. of potassium metal was dissolved in 100 cc. of t-butanol, under an atmosphere of nitrogen, 5 g. of 19-nor-testosterone was added to the solution and when it had dissolved, there was added 6.5 cc. of methyl iodide and the mixture was stirred at room temperature for 4 hours under an atmosphere of nitrogen. It was then poured into water, the organic solvent was removed by vacuum distillation and the precipitate was collected and washed to neutral. Crystallization from acetone afforded 4,4-dimethyl-19-nor-$\Delta^5$-androsten-17β-ol-3-one.

By conventional reaction with acetic anhydride in pyridine there was prepared the 17-acetate derivative of the above compound. In a similar conventional way there was also prepared other esters such as the propionates, benzoates and cyclopentylpropionates.

*Example VI*

5 g. of 17α-methyl-19-nor-testosterone was treated in exactly the same way as described in Example V for 19-nor-testosterone, thus giving 4,4,17α-trimethyl-19-nor-$\Delta^5$-androsten-17β-ol-3-one.

Similarly, the corresponding 17α-ethyl and 17α-propyl derivatives were obtained starting from 17α-ethyl and 17α-propyl-19-nor-testosterone, respectively.

*Example VII*

One gram of 4,4-dimethyl-19-nor-$\Delta^5$-androsten-17β-ol-3-one was added to a suspension of 300 mg. of 5% palladium on charcoal catalyst previously hydrogenated in 50 cc. of methanol. The compound was hydrogenated at 25° C. and atmospheric pressure until the equivalent of 1.1 mols of hydrogen had been absorbed (3 hours). The catalyst was filtered and the solution evaporated. The residue crystallized from acetone-hexane to give 4,4-dimethyl-19-nor-androstan-17β-ol-3-one.

By conventional reaction with acetic anhydride in pyridine there was prepared the 17-acetate derivative of the above compound. In a similar conventional way there was also prepared other esters such as the propionates, benzoates and cyclopentylpropionates.

*Example VIII*

The treatment of 4,4,17α-trimethyl-19-nor-$\Delta^5$-androsten-17β-ol-3-one by the method described in Example VII afforded 4,4,17α-trimethyl-19-nor-androstan-17β-ol-3-one.

We claim:

1. A compound of the following formula:

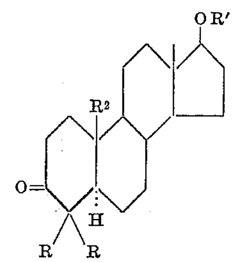

wherein R represents a lower alkyl group; $R^1$ is selected from the group consisting of hydrogen and a hydrocarbon carboxylic acyl group of less than 12 carbon atoms and $R^2$ is selected from the group consisting of hydrogen and methyl.

2. 4,4-di lower alkyl-androstan-17β-ol-3-one.
3. 4,4-dimethyl-androstan-17β-ol-3-one.
4. 4,4-di lower alkyl-19-nor-androstan-17β-ol-3-one.
5. 4,4-dimethyl-19-nor-androstan-17β-ol-3-one.
6. The hydrocarbon carboxylic acid esters of less than 12 carbon atoms of 4,4-di lower alkyl-androstan-17β-ol-3-one.
7. The hydrocarbon carboxylic acid esters of less than 12 carbon atoms of 4,4-di lower alkyl-19-nor-androstan-17β-ol-3-one.
8. A compound of the following formula:

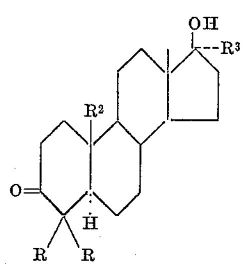

wherein R and $R^3$ represent a lower alkyl group and $R^2$ is selected from the group consisting of hydrogen and methyl.

9. 4,4,17α-tri lower alkyl-androstan-17β-ol-3-one.
10. 4,4,17α-trimethyl-androstan-17β-ol-3-one.
11. 4,4,17α-tri lower alkyl-19-nor-androstan-17β-ol-3-one.
12. 4,4,17α-trimethyl-19-nor-androstan-17β-ol-3-one.
13. 4,4-dimethyl-17α-lower alkyl-androstan-17β-ol-one.
14. 4,4-dimethyl-17α-lower alkyl-19-nor-androstan-17β-ol-3-one.

References Cited in the file of this patent

UNITED STATES PATENTS 2,844,602 Ringold et al. ---------- July 22, 1958